United States Patent [19]

Quarterman

[11] Patent Number: 4,600,360
[45] Date of Patent: Jul. 15, 1986

[54] WIND DRIVEN TURBINE GENERATOR

[76] Inventor: Edward A. Quarterman, 2284 Evans St., Livermore, Calif. 94550

[21] Appl. No.: 624,342

[22] Filed: Jun. 25, 1984

[51] Int. Cl.[4] .......................... F03D 1/04; F03D 7/02
[52] U.S. Cl. .................................... 415/2 A; 415/3; 415/DIG. 1
[58] Field of Search .............................. 415/2 A–4 A, 415/7, 8, DIG. 1 A

[56] References Cited

U.S. PATENT DOCUMENTS

| | | | |
|---|---|---|---|
| 1,312,021 | 8/1919 | Dickinson et al. | 415/4 A X |
| 1,578,923 | 3/1926 | Schlotter | 415/2 A X |
| 3,339,078 | 8/1967 | Crompton | 415/2 A X |
| 3,986,787 | 10/1976 | Mouton et al. | 415/7 |
| 4,021,135 | 5/1977 | Pedersen et al. | 415/3 A |
| 4,025,220 | 5/1977 | Thompson et al. | 415/7 |
| 4,079,264 | 3/1978 | Cohen | 415/2 A X |
| 4,095,918 | 6/1978 | Mouton et al. | 415/7 |
| 4,132,499 | 1/1979 | Igra | 415/3 A X |
| 4,166,596 | 9/1979 | Mouton et al. | 415/2 A X |
| 4,204,799 | 5/1980 | de Geus | 415/2 A |
| 4,218,175 | 8/1980 | Carpenter | 415/2 A |
| 4,219,303 | 8/1980 | Mouton et al. | 415/7 |
| 4,320,304 | 3/1982 | Karlsson et al. | 415/2 A X |
| 4,324,985 | 4/1982 | Oman | 415/3 A X |
| 4,422,820 | 12/1983 | Kirsch et al. | 415/4 A |
| 4,482,290 | 11/1984 | Foreman et al. | 415/DIG. 1 X |
| 4,516,907 | 5/1985 | Edwards | 415/4 X |

FOREIGN PATENT DOCUMENTS

| | | | |
|---|---|---|---|
| 256035 | 11/1983 | Australia | 415/2 A |
| 111376 | 11/1928 | Austria | 415/3 A |
| EP45264 | 2/1982 | European Pat. Off. | 415/3 A |
| 729534 | 12/1942 | Fed. Rep. of Germany | 415/4 A |
| 2518405 | 11/1976 | Fed. Rep. of Germany | 415/2 A |
| 2930073 | 2/1981 | Fed. Rep. of Germany | 415/2 A |
| 675697 | 2/1930 | France | 415/4 A |
| 866053 | 6/1941 | France | 415/2 A |
| 891697 | 3/1944 | France | 415/2 A |
| 975625 | 3/1951 | France | 415/2 A |
| 56102 | 9/1952 | France | 415/4 A |
| WO81/00286 | 2/1981 | PCT Int'l Appl. | 415/199.5 |

*Primary Examiner*—Everette A. Powell, Jr.
*Attorney, Agent, or Firm*—H. Michael Brucker

[57] ABSTRACT

A wind powered turbine augmented by a superstructure which forms a low pressure chamber for receiving turbine exhaust air and which is maintained at below atmospheric pressure by the action of wind directed to flow over adjustable inverted airfoils mounted on the superstructure adjacent exhaust ports from the low pressure chamber.

10 Claims, 3 Drawing Figures

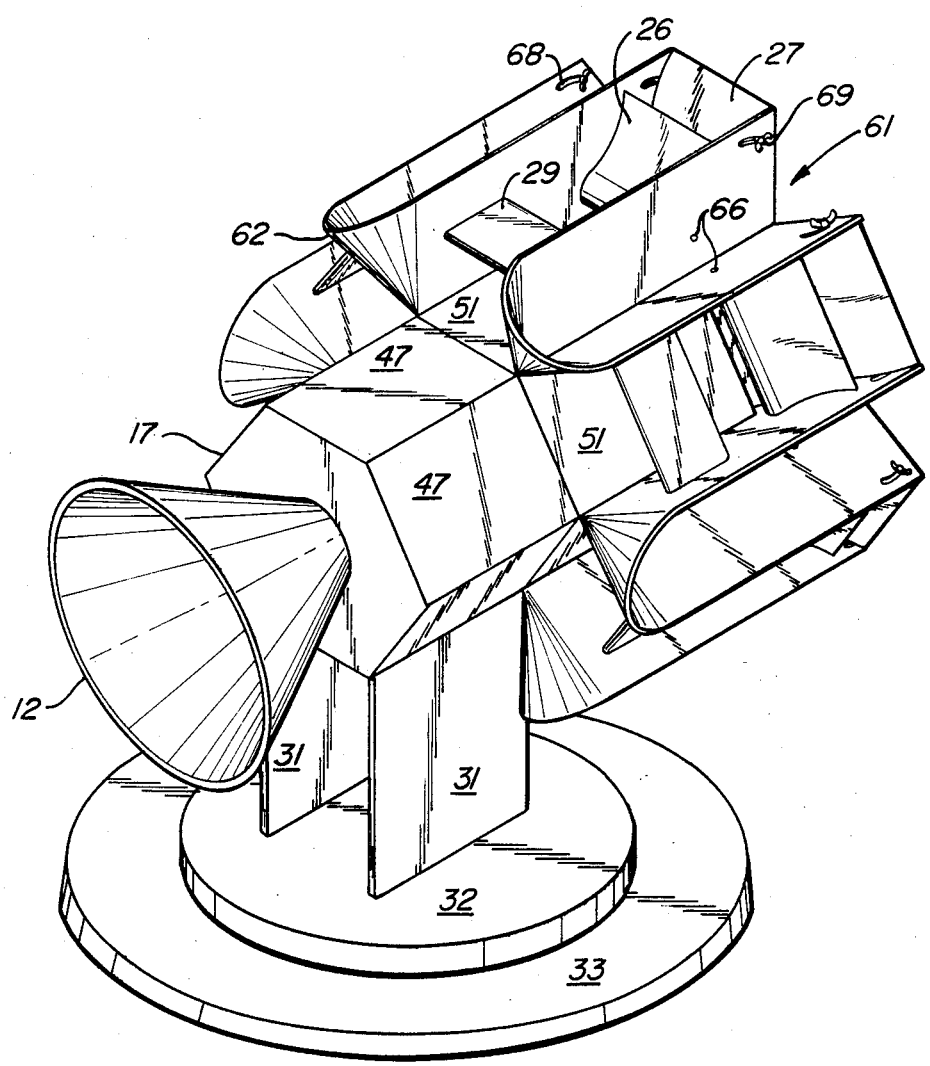
FIG._1.

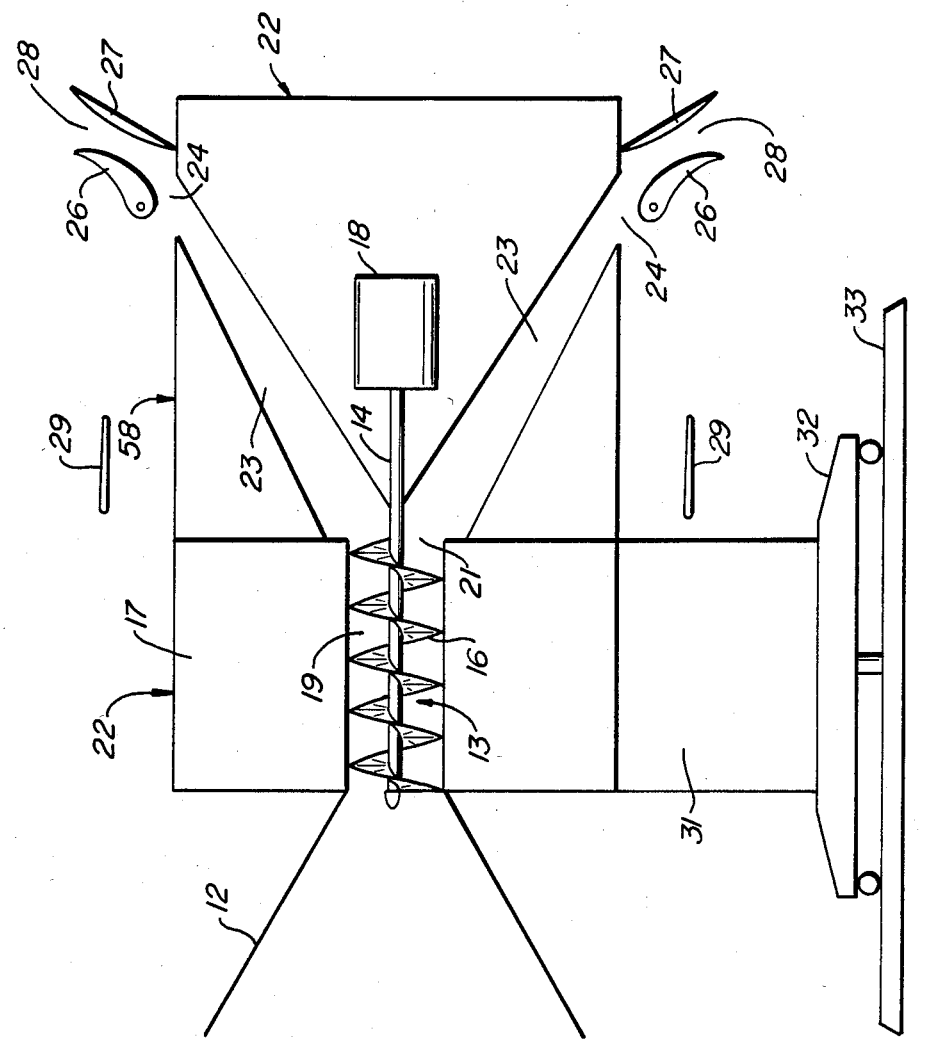
FIG._2.

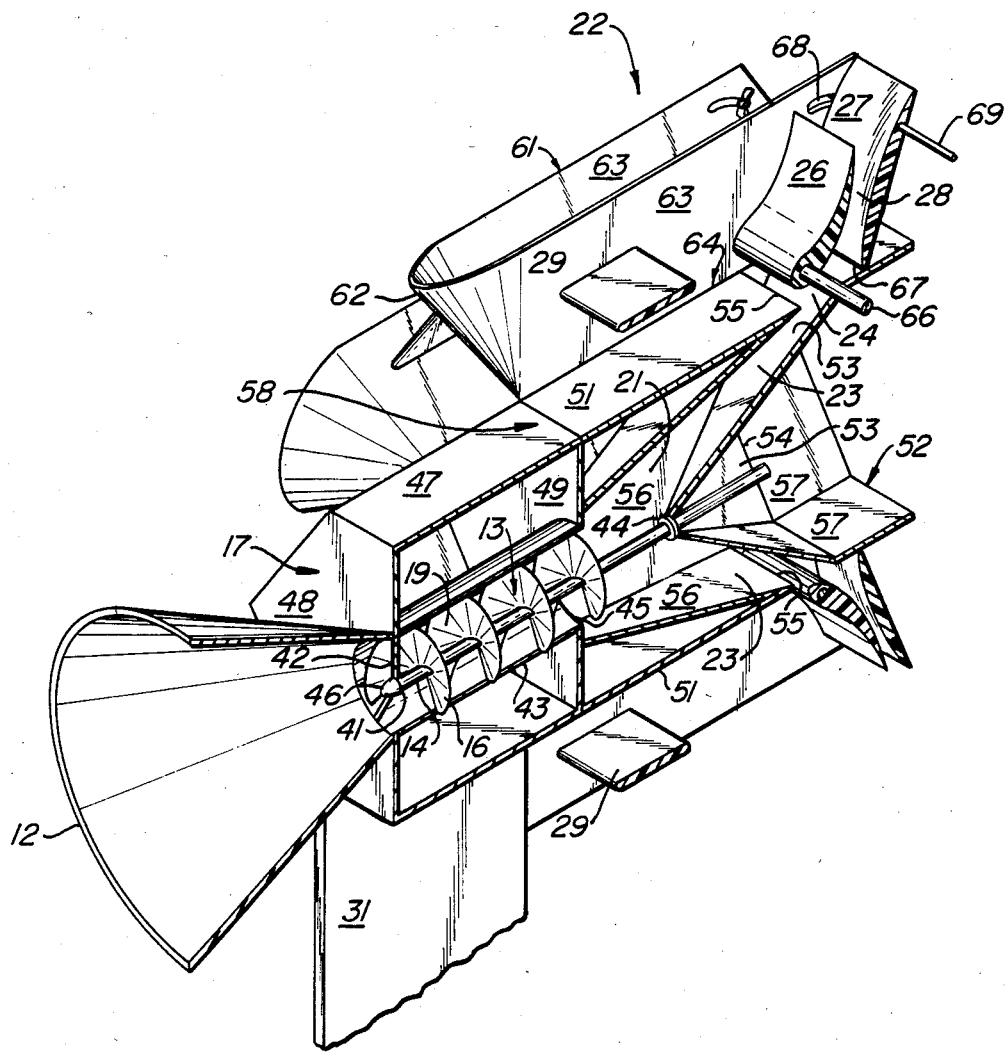
FIG._3.

WIND DRIVEN TURBINE GENERATOR

DESCRIPTION

The present invention relates to wind powered turbines for the production of electrical or mechanical energy.

BACKGROUND ART

The idea of harnessing the energy "free" in the air by using the passing wind to rotate a shaft in order to produce useful work has long intrigued the inventive mind and for many centuries now been realized in a variety of forms. In the recent past, the advent of electrical energy and abundant fossil fuels resulted, in the most part, in the relegation of devices for harnessing wind forces to museums and country-side oddities.

During the past several years, however, the recognition of the limited supply of fossil fuels and the soaring costs of energy in general have created a renaissance in "wind machines" all seeking to extract energy from the passing air with sufficient efficiency to constitute practical sources of electrical and mechanical power.

In its simplest form, a "wind machine" comprises a shaft which carries sails or blades or other means of catching the wind and rotating the shaft from which mechanical or electrical power is generated. Within given limits the velocity with which the shaft rotates is roughly proportional to the velocity of the wind acting on the shaft's rotators and to the amount of energy produced. The faster the shaft rotates for a given velocity of wind and a given load, the greater is the efficiency with which wind energy is converted into mechanical or electrical energy.

It has thus been one approach to increasing the efficiency of wind generating machines to increase the efficiency of the rotation of the working shaft for a given wind velocity.

In U.S. Pat. No. 4,204,799 to de Geus, issued May 27, 1980, increased efficiency is purported to result from the disposition of a diffusor positioned downstream of the working blades which forms a venturi which decreases the downstream pressure so as to "pull" the air through the blades and thereby render them more efficient. Similarly, in U.S. Pat. No. 4,166,596 to Mouton, Jr., et al., issued Sept. 4, 1979, a "vena contracta" is disposed downstream of the turbine section of the power generator so as to create an area of reduced pressure to facilitate the air passing through the generator and thereby add to the efficiency of the energy extracted from the wind.

U.S. Pat. No. 4,258,271 to Chappell, et al., issued Mar. 24, 1981, also speaks of reducing the downstream pressure and thereby increasing the power output of an impeller mounted to catch the wind (or other fluid) and produce energy.

None of the references mentioned above, nor any others known to applicant disclose a means for reducing downstream pressure which includes a low pressure chamber for receiving turbine exhaust air or means for adjusting the mechanism which reduces the downstream pressure as is taught by the present invention. Other features of the present invention also not disclosed by any known prior art further increase the efficiency with which the present invention extracts energy from the air and converts it to electrical or mechanical power.

OBJECTS OF THE PRESENT INVENTION

It is an object of the present invention to provide a downstream pressure regulating mechanism for use in combination with a wind driven turbine to effect a pressure reduction at the exhaust end of the turbine and thereby increase the air flow through the turbine blades for a given velocity of wind.

It is another object of the present invention to provide a low pressure chamber contiguous with and downstream of the turbine exhaust which is maintained at below atmoshpereic pressure by the action of the wind itself.

It is a further object of the present invention to use the principles known in connection with airfoils to reduce the pressure downstream of a turbine so as to increase the efficiency of energy extraction from the wind.

An additional object of the present invention is to provide airfoils which are adjustably mounted downstream of the working turbine and adjusted relative to the direction of the wind to most effectively reduce the pressure downstream of the turbine.

Yet another object of the present invention is to provide a superstructure for a wind driven turbine which smooths and directs the wind over inverted airfoils mounted thereto downstream of the working turbine to effect a pressure reduction downstream of the turbine so as to increase the velocity of the wind through the turbine.

SUMMARY OF THE INVENTION

The above objects and others are achieved by the present invention in which a turbine comprising turbine blades are disposed in a turbine housing and mounted on a shaft to catch the wind and caused to rotate thereby, whereby electrical or mechanical energy can be generated by the rotating shaft. The present invention provides a superstructure disposed around and downstream of the turbine blades to effect a pressure reduction at the exhaust end of the turbine so as to increase the efficiency with which rotation occurs for a given velocity of wind. The superstructure of the present invention provides a low pressure chamber coextensive with the exhaust end of the turbine and includes a plurality of discharge passages terminating in discharge ports which communicate with the atmosphere. The discharge ports lie generally in the plane of a plurality of channel bottom surfaces which are disposed circumjacent the turbine shaft and generally parallel thereto at regular intervals. The channel planes are separated by an equal number of mounting baffles which extend radially outward from the intersection of channel planes and form the walls of channels which are longitudinally aligned with the wind under working conditions. Airfoils are mounted in a generally inverted position between adjacent channel walls immediately above the discharge ports in the channel floors. The mounting of the airfoils is by means of a shaft which permits rotation and thereby adjustment of the attitude of the airfoil relative to the wind. Mounted upstream of the airfoils also between adjacent channel walls, are streamlined (symmetrical) wing sections which act to smooth the wind of turbulence so that the wind which passes around the surfaces of the airfoil is relatively smooth. Mounted immediately downstream of the airfoils between adjacent channel walls are generally concave deflector plates with corrugated surfaces which form with the downstream surface of the airfoils a venturi which pass both the wind which is directed down the channels as well as the air that exits the discharge ports. The deflector plates like the airfoils are adjustably mounted so that their angular relationship to the airfoils can be maintained at the most efficient position.

When the wind passes through the channels of the superstructure it passes on either side of the inverted airfoil (inverted that is with respect to the airfoil of an airplane where reduced pressure is, of course, required on the upper surface) which being inverted causes a reduced pressure on its underside and thus at the discharge port immediately adjacent the underside of the airfoil. The deflector plate which creates a venturi with the airfoil assures that the passage of air around the concave surface of the airfoil is smooth and continuous and thus produces the greatest pressure drop possible at each discharge port. The pressure drop at the discharge ports results in a pressure drop within the entire low pressure chamber behind the turbine such that the air which leaves the turbine blades enters into a chamber at a pressure lower than atmospheric pressure thus enhancing the operation of the turbine over that which would occur if the exhaust were simply to the atmosphere.

The entire turbine and superstructure are rotatably mounted on a platform so that the intake cone of the turbine can be pointed into the prevailing wind so as to gather and direct it into the turbine blades.

BRIEF DESCRIPTION OF THE DRAWINGS

FIG. 1 is an isometric view of the present invention;

FIG. 2 is a generally schematic illustration of the present invention; and

FIG. 3 is a isometric view similar to FIG. 1 but with portions broken away to reveal the interior of the invention.

DESCRIPTION OF THE INVENTION

The dynamics of the present invention are best described with reference to FIG. 2. The wind 11 enters a turbine intake cone 12 where it is directed to a turbine 13 comprising a turbine shaft 14 and turbine blades 16. The shaft 14 is rotatably mounted and disposed partially within a turbine chamber 19 defined by a turbine housing 17 and when caused to rotate by the wind, generates mechanical or electrical energy through energy conversion means 18 which does not constitute a portion of the present invention and which can be one of many such devices well known in the art.

The efficiency with which energy is extracted from the wind is a function of the square of the velocity with which the wind passes through turbine chamber 19 and thus the velocity at which the turbine rotates.

In the present invention, a low pressure chamber 21 is disposed immediately downstream of the turbine chamber 19 and defined by a portion of a superstructure 22 which surrounds the turbine including at least a portion of shaft 14. The low pressure chamber 21 communicates with the atmosphere through low pressure passages 23 which are also part of, and defined by, the superstructure 22 and which terminate at discharge ports 24. Air foils 26 are disposed immediately adjacent the discharge ports 24 and are positioned relative to the direction of the wind 11 so as to create a low pressure area at discharge port 24. To assist the airfoil 26 in reducing the pressure at port 24, concave deflector plates 27 (the surface of which may be corrugated) are disposed adjacent to and downstream of foils 26 and create a venturi 28 therebetween. Streamlined (symmetrical) wing sections 29 are positioned upstream of the foils 26 and generally in the path of the wind which eventually reaches foils 26 so as to smooth out any turbulence in the air and thus enhance the pressure lowering characteristics of the foil.

In operation, wind 11 passes over and is smoothed out by foil 29 after which it passes on either side of airfoil 26 which is positioned to create a drop in pressure at port 24. The pressure at ports 24 extends back into low pressure chamber 21 resulting in the air passing through the turbine chamber 19 moving with greater velocity than if the turbine chamber 19 merely exhausted into the atmosphere. As the wind leaves the turbine chamber 19 it passes through low pressure chamber 21 into passages 23, out port 24 and through the venturi 28 between foil 26 and deflector plate 27.

The foil 26 and deflector plate 27 are adjustably mounted so that the angle between the wind and foil 26 as well as the size of the venturi 28 can be regulated to maximize the pressure drop induced by the action of the airfoil and thus maximize the pressure differential between the intake cone 12 and the low pressure chamber 21 and thereby increase the velocity of the air which passes over the turbine blades 16.

The entire structure is mounted on a pair of vertical support members 31 which rest on a platform 32 which is rotatably mounted to a base 33. In this way, the intake cone 12 can be pointed into the wind and thus maximizes its efficiency.

The particular embodiment of the present invention described below, utilizes six airfoils equally spaced around the superstructure adjacent six discharge ports. This hexagonal configuration is not a limitation of the present invention the principles of which are equally applicable to a superstructure providing more than six or less than six pressure reducing airfoils and associated discharge ports. That the particular embodiment illustrated and described below has six identical elements should not be taken as excluding other configurations using a different number of pressure reducing elements around the downstream portion of the turbine. It is equally true that a symmetrical array of pressure reducing elements is not a requirement for successful utilization of the principles inherent in applicant's invention. That is to say, regardless of the number of foils and associated discharge ports which are deployed to reduce the pressure downstream of the turbine blades, their disposition about the turbine shaft need not be symmetrical. Although in most applications, the greatest utilization of the wind to reduce the downstream pressure will occur when all of the surrounding areas able to "see" the wind are employed to assist in reducing the pressure in the low pressure chamber.

The following detailed description of the invention is best understood with reference to FIGS. 1 and 3, where the turbine shaft 14 is rotatably mounted in a forward bearing 41 which is supported by bearing struts 42 which are mounted in turbine chamber shell 43 which defines the turbine chamber 19 which contains the turbine blades 16. An aft bearing 44 supports the other end of turbine shaft 14 and is disposed in the superstructure to be described in greater detail below.

Turbine chamber shell 43 is cylindrical in form with an inlet end 46 opening into intake cone 12 and receiving the wind air which drives the turbine. The discharge end 45 of the turbine shell 43 opens into low pressure chamber 21 which is formed by the superstructure 22 more particularly described below.

The intake cone 12, the turbine 13, the turbine chamber shell 43 and the energy conversion unit 18 comprise the basic turbine while the remainder of the structure shown comprises the superstructure 22 which provides the turbine of the present invention with its superior operating characteristics.

The housing 17 constitutes the forward end of the superstructure and surrounds the turbine chamber shell 43 radially outwardly therefrom. Turbine housing 17 comprises a cowling 40 of hexagonal cross-section formed by a plurality (six in this case) of planar surface members 47 together with housing end members 48 and 49. The particular shape of housing 17 is not as important as is the disposition of planar members 47 relative to the surfaces which form the air channels described below. In order to decrease turbulence and induce smooth air flow, it is desirable that the superstructure be constructed primarily of smooth surfaces with as few discontinuities as possible. The superstructure downstream of housing 17 surrounds the portion of the turbine aft of the working blades and comprises superstructure planar surface members 51 which form an outer surface of hexagonal cross-section contiguous with the cowling planar surfaces members 47. Although described as separate, it will be readily observed that planar surface members 47 and 51 can be formed as a unitary structure without in any way departing from the present invention.

The superstructure 22 further comprises an end closure structure 52 including generally triangular end members 53 which are joined together to form a cone of hexagonal cross-section which carries an aft shaft bearing 44 at its apex for shaft 14. End members 53 define the rear wall of chamber 21, and are disposed so that their bases 54 are located in the same plane as, but spaced from, the trailing edges 55 of planar surface members 51 so as to define ports 24.

Support struts 56 are connected between planar members 51 and the downstream end plate 49 of housing 17 to support planar members 51 and define low pressure passages 23 together with end members 53. Thus, planar members 51, struts 56, and triangular end plate members 53 define the low pressure chamber 21 which is in communication with the atmosphere only through ports 24 and the exhaust end of turbine chamber 19. Accordingly, by lowering the pressure at ports 24 the pressure within the chamber is also lowered.

The end plate 52 of superstructure 22 further comprises tail plates 57 which extend from the bases 54 of triangular end plate members 53 at an angle thereto so as to lie in the same plane as planar members 47 and 51 previously described. Thus, the exterior surfaces of planar members 47, 51 and 57 are aligned to form smooth surfaces interrupted only by ports 24 and together constitute channel floors 58.

A channel defining mounting baffle 61 having a "v"-shaped cross-sections is mounted at each junction between adjacent members 51 and extends radially outwardly therefrom. Leading ends 62 of mounting baffles 61 have conicle surfaces so that the wind will be directed to either side without creating any undue turbulence. The walls 63 of each mounting baffle 61 are connected at their apex edge 64 to planar members 51 and together with the walls of adjacent baffles 61 and channel floors 58 form air channels which direct the wind to the air foils 26.

Airfoils 26 are mounted on shafts 66 which are disposed immediately above ports 24 and span the walls 63 of adjacent mounting baffles 61. Shafts 66 are rotatably (not shown in detail) mounted within the walls 63 to permit the angle of airfoils 26 to be adjustable. Airfoils 26 are, as is well known in the art, shaped to present paths of different lengths to the wind whereby a reduced pressure is realized along the surface of greater length which in the case of the present invention is the surface adjacent port 24. The airfoils 26 are considered inverted in this case since in the normal case where they are used in aircraft, the surface of reduced pressure is most desirably disposed above.

In the present invention, the wind other than that which is gathered by intake cone 12 flows down the channels formed by the channel floors and mounting baffle walls to the airfoils 26 where it moves along both sides of the airfoils. The underside of the airfoils having a greater length establishes an area of reduced pressure which occurs at ports 24 where as previously described the exhaust from turbine 13 is ultimately required to exit chamber 21.

To further assist in establishing the pressure reduction at ports 24, concave-shaped deflector plates 27 (with corrugated surfaces) are mounted on tail members 57 downstream of airfoils 26 and at a positions relative thereto to form a venturi 28 between the downstream surface of each airfoil 26 and associated deflector plate 27. Deflector plates 27 are mounted to their associated end plates 53 by a hinge 67 which together with a pin 69 attached to plate 27 and slot 68 in mounting baffle wall 63 permits the angle of deflector plate 27 to be adjustable enabling it to be positioned to its most effective location relative to airfoil 26.

The flow of air (wind) at a given location site generally has characteristic flow patterns associated with wind direction and local turbulence. The adjustability of the positions of airfoils 26 and deflector plates 27 permit the present invention to be trimmed for maximum operating efficiency at a given site. Although not disclosed in detail by the present invention, it is complicated that the adjustment of foils 26 and deflector plates 27 can be automated by means detecting the pressure at ports 24 and means trimming airfoils 26 and deflector plates 27 to achieve maximum operating configurations.

Also mounted between the walls of adjacent mounting baffles 61 are the streamlined (symmetrical) wing sections 29 which are disposed upstream of airfoils 26 so as to intercept the wind before it reaches the airfoils 26 and smooth out any turbulence that exists in the air as it flows down the channels.

Intake cone 12 is dimensioned to gather as much air as can be practically processed through the turbine 19 and once that dimension is fixed, the superstructure 22 is dimensioned to dispose the channel floors 58 at a radial distance from the turbine shaft 14 greater than that of the greatest circumference of cone 12 so that the wind has a clear path to foils 26.

Thus, it is seen from the description given above that in the present invention, the energy from the wind is used not only to impact upon and rotate the turbine blades 16 but is further used to significantly reduce the pressure at the exhaust end of the turbine and assure a significant increase in the energy available for extraction from the wind that passes through the turbine. It will be appreciated that the platform 32 can be angularly controlled remotely and by use of a weather vane or other wind direction sensing mechanism can be automatically positioned to face the intake cone 12 into the wind at all times.

From the foregoing it will be seen that this invention is one well-adapted to attain the ends and objects hereinabove set forth, together with other advantages which are obvious and which are inherent in the apparatus.

It will be understood that certain features and sub-combinations are of utility and may be employed with reference to other features and sub-combinations. This is contemplated by and is within the scope of the claims. As many possible embodiments may be made of the invention without departing from the scope thereof, it is to be understood that all matter herein set forth and shown in the accompanying drawing is to be interpreted as illustrative and not as limiting.

What is claimed:

1. An improved wind driven turbine generator including turbine blades disposed in a turbine housing and mounted on a rotatably mounted turbine shaft wherein said turbine housing defines an air inlet opening and an air discharge opening whereby air passing from said inlet opening to said discharge opening impinges on said turbine blades causing said shaft to rotate, the improvement comprising:
    a low pressure chamber disposed to receive air from the discharge opening of said turbine housing, said low pressure chamber defining a plurality of discharge ports; and
    an airfoil mounted adjacent to at least one of said discharge ports where the longer air path of said airfoil is closest to said port whereby wind passing around said airfoil reduces the pressure at said port.

2. The invention in claim 1 wherein each airfoil is adjustably mounted adjacent a discharge port whereby the angle of each airfoil relative to the wind can be adjusted to produce the maximum pressure reduction at its adjacent port.

3. The invention in claim 2 further comprising a deflection plate disposed adjacent to and downstream of said airfoil whereby air from a discharge port is directed between said airfoil and said deflector plate.

4. The invention in claim 3 wherein said deflector plates are adjustably mounted relative to said airfoils and include a concave surface in facing relation to said airfoils.

5. An improved wind driven turbine generator including turbine blades disposed in a turbine housing and mounted on a rotably mounted turbine shaft wherein said turbine housing defines an air inlet opening and an air discharge opening whereby air passing from said inlet opening to said discharge opening impinges on said turbine blades causing said shaft to rotate, the improvement comprising:
    a superstructure surrounding the turbine blades and at least a portion of the turbine shaft and defining a low pressure chamber located to receive air flow from the discharge opening of the turbine housing, and further defining a plurality of discharge ports in said low pressure chamber with the atmosphere;
    channel forming members integral with said superstructure defining a plurality of channels which are generally parallel to the turbine shaft and which each include a smooth channel floor between channel walls wherein said floor is continuous except for said low pressure chamber ports which are located in said channel floors; and
    airfoils disposed in said channels adjacent said ports whereby wind passing through a channel and around an airfoil reduces the pressure at said ports.

6. The invention of claim 5 wherein each airfoil is adjustably mounted between adjacent channel walls whereby the angle of each of said airfoils relative to the wind can be adjusted to produce the maximum pressure reduction at said port.

7. The invention of claim 6 further comprising a deflection plate disposed between adjacent channel walls and adjacent to and downstream of said airfoil whereby air from a discharge port is directed between said airfoil and said deflector plate.

8. The invention of claim 7 wherein said deflector plates are adjustably mounted relative to said airfoils and include a concave surface in facing relation to said airfoils.

9. The invention of claim 8 further comprising a symmetrical wing section disposed in each channel upstream of said pressure reduction means whereby any turbulence in the air passing through a channel will be reduced before reaching said pressure reducing means by first passing around said wing section.

10. The invention of claim 9 further comprises a rotatable platform on which the turbine generator is mounted whereby the air inlet of the turbine housing can be pointed in the direction of the wind.

* * * * *